May 18, 1965   R. A. WHITLOCK ETAL   3,183,933
MULTIPORT VALVE FOR WATER TREATMENT SYSTEM
Filed April 12, 1962   2 Sheets-Sheet 1
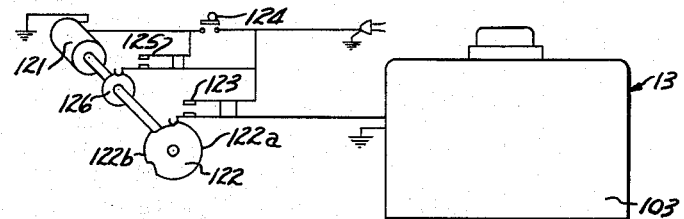
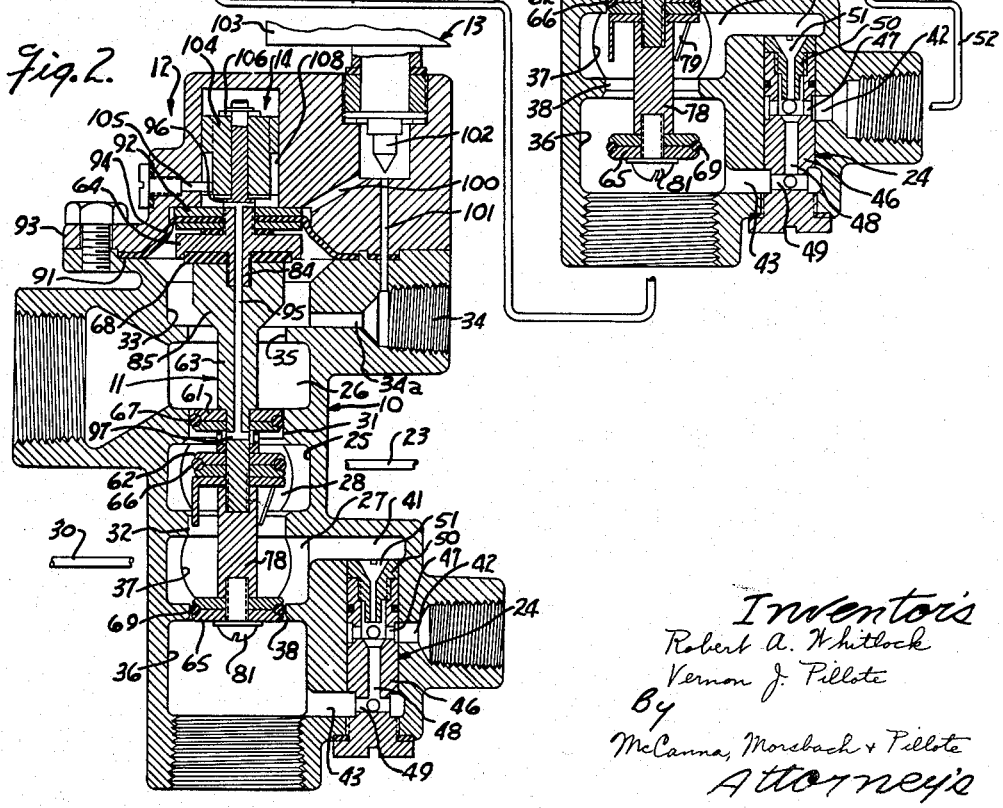
Inventors
Robert A. Whitlock
Vernon J. Pillote
By
McCanna, Morsbach & Pillote
Attorneys

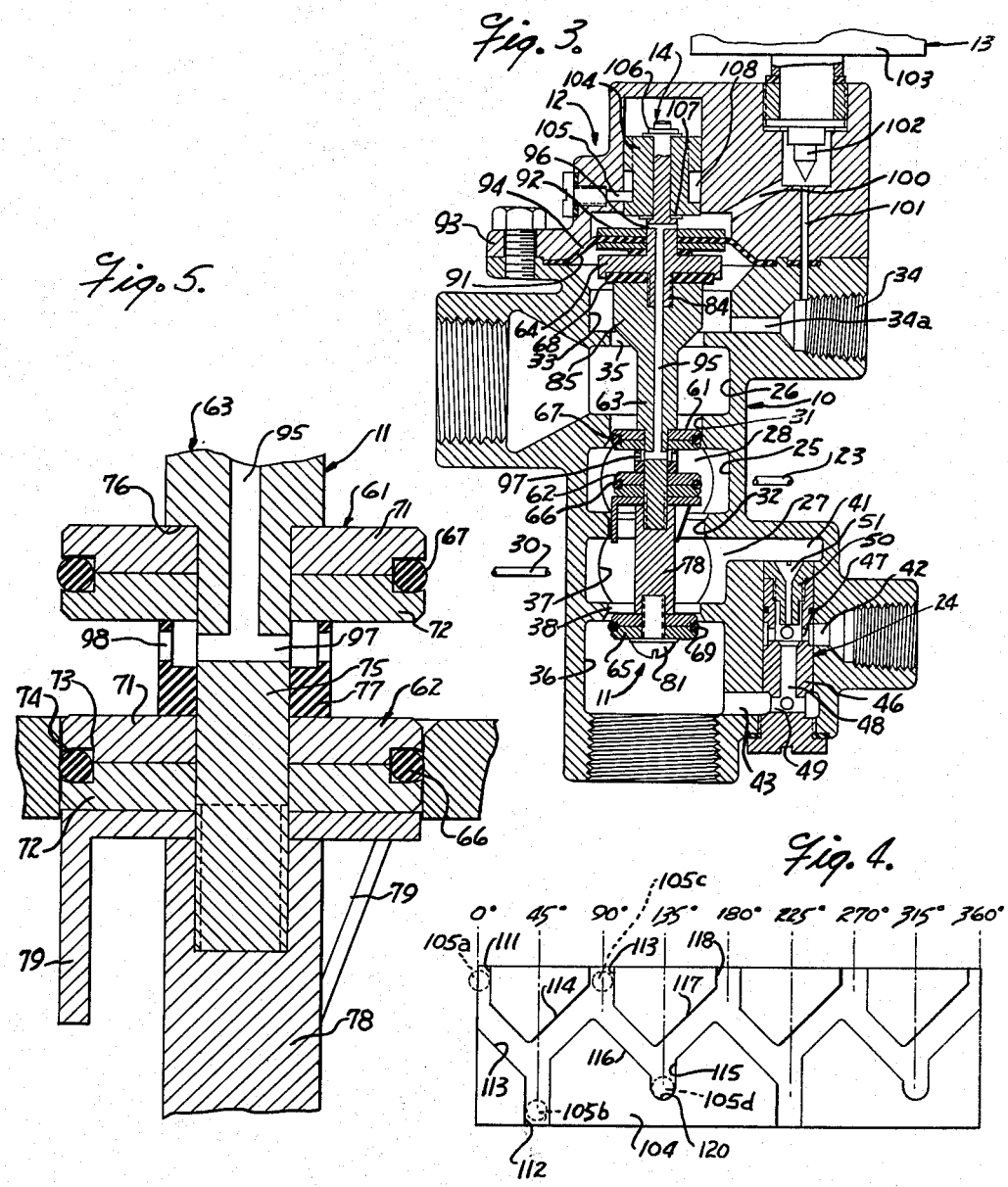

United States Patent Office 3,183,933
Patented May 18, 1965

3,183,933
MULTIPORT VALVE FOR WATER TREATMENT SYSTEM
Robert A. Whitlock and Vernon J. Pillote, Rockford, Ill., assignors to AquaMatic Inc., Rockford, Ill., a corporation of Illinois
Filed Apr. 12, 1962, Ser. No. 187,067
11 Claims. (Cl. 137—624.18)

This invention relates to multiport valves and particularly to a multiport valve for use in a water treatment system to control the various flows of fluid therethrough.

An important object of this invention is to provide an improved multiport valve for a water treatment apparatus for automatically controlling the various flows through the treatment apparatus during the successive phases of a regeneration cycle including service; regeneration; and rapid rinsing of the bed of exchange material, and which valve is of simple and economical construction and reliable in operation.

Another object of this invention is to provide a multiport valve of the type having a valve member which is reciprocable to different flow positions, and which valve requires only a single electro-responsive actuator for stepping the valve between a plurality of different positions to control the successive phases of a regeneration cycle in a water treatment apparatus.

A more particular object of this invention is to provide a simple and reliable mechanism for a reciprocable type flow control valve to automatically stop the reciprocable valve member in a plurality of different axial positions to control the several different flows during the successive phases of a regeneration cycle in a water treatment apparatus.

These, together with other objects and advantages of this invention will be appreciated as the same becomes better understood by reference to the following detailed description when taken in connection with the accompanying drawings wherein:

FIG. 1 is a longitudinal sectional view through the multiport valve with the parts shown in the service position;

FIG. 2 is a longitudinal sectional view through the valve in the regeneration position thereof;

FIG. 3 is a sectional view through the valve illustrating the same in the rapid rinse position;

FIG. 4 is a layout of the cam type apparatus for controlling positioning of the valve member; and FIG. 5 is an enlarged fragmentary sectional view through a part of the movable valve member, illustrating details of the construction.

The multiport valve of the present invention in general includes a casing or body 10 having a plurality of axially spaced ports and a valve member 11 which is reciprocable to different positions to control the flows of fluid through the ports during the successive phases of a regeneration cycle in a water treatment apparatus. A valve member operator 12 is provided for reciprocating the stem under the control of an electro-responsive actuator 13, and an apparatus 14 is provided for controlling the movement of the valve member to different positions upon successive reciprocations of the valve member. The valve is connected through conduits 16 and 17 to a water treatment tank 18 having a bed 19 of exchange material therein. Regenerant is supplied to the treatment apparatus from a regenerant tank 21, and the amount of regenerant supplied to the treatment apparatus is controlled by a regenerant control valve 22 disposed in the tank. Regenerant is fed from the regenerant tank 21 to the treatment tank 18 by an ejector 24. The valve illustrated herein is arranged to provide a cycle of downflow through the treatment tank during service; upflow during regeneration and slow rinsing; and upflow during a subsequent rapid rinse phase and, in accordance with the present invention, the valve is constructed so that the single valve member operated by the single electro-responsive actuator 13, controls the flow during each of the above-mentioned phases of the regeneration cycle.

Referring more specifically to FIGS. 1–3, the casing 10 includes an inlet chamber 25 and first and second flow chambers 26 and 27. An inlet passage 28 communicating with a supply pipe 23 is connected to the inlet chamber for supplying liquid under pressure thereto and first and second ports 31 and 32 are provided in the casing to communicate the inlet chamber 25 with the first chamber 26 and with the second chamber 27, respectively. A drain chamber 33 is also provided in the casing and has a drain passage 34 communicating therewith and adapted for connection to a suitable drain outlet. A drain port 35 is formed in the casing to communicate the first chamber 26 with the drain chamber 33. The valve casing also includes a lower chamber 36 forming a part of the flow passage which includes the conduit 17 leading to the bottom of the treatment tank 18. In order to provide a flow of raw water to a service line 30 during regeneration, a service outlet port 37 is advantageously arranged to communicate with the second chamber 27 and a by-pass port 38 communicates the lower chamber 36 with the second chamber 27.

The ejector 24 has a raw water inlet 41, a regenerant inlet 42 and an outlet 43. The ejector may be of any suitable construction and as shown includes a tubular body 46 which is threaded into a bore in the valve casing and has a regeneration inlet passage 47, a throat passage 48 and an outlet passage 49 formed therein. A nozzle 50 is threaded into the end of the body 46 and has a nozzle passage 51 extending from the raw water inlet to the regenerant inlet. As is conventional the nozzle passes a restricted jet of raw water through the throat 48 to draw regenerant into the regenerant inlet 42, which inlet is connected as through a conduit 52 to the regenerant control valve 22 in the tank 21.

The multiport control valve shown herein is arranged to provide upflow during regeneration and the ejector outlet passage 48 communicates with the lower chamber 36 to pass the mixture of water and regenerant to the bottom of the treatment tank during regeneration. The inlet 41 of the ejector is connected to a source of water under pressure and is advantageously connected to the second chamber 27, as is clearly shown in FIGS. 1–3.

In accordance with the present invention, the reciprocable valve member 11 includes a plurality of valve elements all mounted on a common stem for controlling the flows of fluid through each of the ports 31, 32, 35 and 38. In the form shown, the movable valve member 11 includes valve elements 61 and 62 attached to a stem 63 and arranged to control flow through ports 31 and 32. The reciprocable valve member also includes a drain valve 64 attached to the stem 63 for controlling flow through the drain port 35, and a by-pass valve member 65 also attached to the stem 63 for controlling the flow through the by-pass port 38. During service, the reciprocable valve member 11 is positioned as shown in FIG. 1 and the valve element 62 has a resilient O-ring 66 on the outer periphery thereof arranged to form a sliding seal with the second port 32 to block flow from the inlet chamber 25 to the second chamber 27. The valve element 61 similarly has an O-ring 67 on its outer periphery arranged to form a sliding seal with the first port 31, when the valve member is in its raised position shown in FIGS. 2 and 3. The drain valve element 64 has a gasket 68 on its face adapted to seat around the periphery of the drain port 35, when the valve member 11 is in its lower position shown in FIG. 1. The by-pass valve element 65 has an O-ring 69 on its periphery arranged to form a sliding seal with the by-pass port 38, when the by-pass valve is in its fully raised position shown in FIG. 2.

Problems have been encountered in using peripheral O-ring gaskets in reciprocating valves of the type due to cutting and scoring of the O-ring as they move into the valve seat. To overcome this problem, the O-rings are preferably clamped on the valve member in such a manner as to control outward movement of the gaskets due to expansion of the rubber or the entrance of fluid pressure at the underside of the O-rings. As best shown in FIG. 5, the valve elements 61, 62 and 65 are each conveniently formed by a pair of disks having mating grooves for receiving and clamping the O-rings. The valve members are each preferably formed in the same manner to simplify the number of different parts which must be formed, and like numerals are used to designate corresponding parts of the several valve elements 61, 62 and 65. In particular, each of these valve elements include a pair of disks 71 and 72 having peripheral recesses 73 in the mating faces thereof dimensioned to snugly receive the respective O-ring. The recesses are preferably formed with an inwardly extending lip 74 at the outer edge to retain the O-ring in the groove. As will be noted, the O-rings can project a short distance outwardly of the disks, but excessive outward movement is positively limited by the lips 74. The disks of valve elements 61 and 62 are conveniently assembled on the stem in the manner shown in FIG. 5. As shown, the stem 63 is formed with a reduced diameter portion 75 defining a shoulder 76. The disks 71 and 72 of valve element 61 are assembled on the portion 75 in abutting relation with the shoulder 76 and the disks of valve element 62 are spaced from valve element 61 by a spacer 77. An extension 78 is threaded on the portion 75 to clamp the disks of valve elements 61 and 62 against the shoulder 76, and a pronged stem guide 79 is positioned below the valve element 62 to guide the lower end of the valve member in the valve seat 72. The disks of valve element 65 are clamped to the lower end of the extension 78 by a fastener 81 (see FIGS. 1–3). The drain valve 64 is conveniently in the form of a disk having a portion 84 threaded into the upper end of the stem to clamp the gasket 68 thereto. For reasons described hereafter, the stem has an enlarged portion 85 that extends downwardly below the drain valve element 64 and is loosely received in the drain port 35 to define a restricted flow path therearound, when the valve member is out of its raised position shown in FIGS. 2 and 3.

The valve is advantageously fluid operated and for this purpose, has a diaphragm 91 attached thereto and which overlies the end of the valve casing. The diaphragm is attached to the stem 63 of the valve by spaced reinforcing washers 92 and the periphery of the diaphragm is clamped to the valve casing by a cap 93. The cap defines an operator chamber 94 at one side of the diaphragm 91 and provision is made for supplying and exhausting fluid under pressure from the operator chamber to reciprocate the valve member. Advantageously fluid under pressure is continuously supplied to the operator chamber through a passage 95 formed in the valve stem. The passage communicates at one end 96 with the operator chamber 94 and at the other end 97 with one of the flow chambers such as the inlet chamber 25. As will be noted from FIG. 5, the spacer 77 has opening 98 and an internal groove therein for communicating the opening 97 in the stem with the chamber 25. Fluid is selectively exhausted from the operator chamber through a passage 100, 101 under the control of the selectively operable valve 102. In the form shown, the valve 102 is normally closed and has an electro-responsive operator 103 such as a solenoid for opening the same to pass fluid from the operator chamber to the drain passage 34 in the valve casing.

The apparatus 14 for controlling positioning of the valve member 11 is advantageously located in the operator chamber 94 so as to be out of the path of flow of fluid through the valve. The apparatus 14 includes an annular cam member 104 and a follower member 105. The cam member is mounted on the stem 63 for reciprocation therewith and is arranged to rotate relative to the cap as the stem reciprocates. In the form shown, the cam member is rotatably supported on the stem between a washer 106 and a shoulder 107. Alternatively, the cam member could be non-rotatably attached to the stem and the stem rotatably attached to the diaphragm 91 to permit relative rotation between the cam member and the valve casing. The cam member 104 has an annular cam track 108 thereon disposed concentric with the valve stem and the follower 105 extends into the cam track and rotates the cam in step fashion as the stem is reciprocated by the fluid operator 91. The cam member is arranged to stop the valve member in different positions on subsequent reciprocations of the valve member and, conveniently, the cam track is so shaped as to coact with the follower 105 to form the necessary stops. The cam track is best shown in the layout of the cam in FIG. 4. In the particular valve shown, the cam is arranged to turn through only 180° during a complete regeneration cycle and, accordingly, the cam track between 180° and 360° is formed the same as the cam track between 0° and 180° to duplicate the cycle of operations during a subsequent regeneration. For convenience, only the cam track between 0° and 180° will be described, it being understood that the remaining portion of the cam track is a duplicate thereof. As shown, the cam track includes upper and lower relatively parallel portions 111 and 112 and a downwardly inclined groove 113 which interconnects the portions 111 and 112 to guide the cam follower from the position 105a in the upper track portion 111 to the position 105b in the lower track portion 112 during the initial raising of the cam member and valve stem. The cam track also includes a second upper portion 113 and an upwardly inclined groove 114, the upper side of which groove overlies the upper end of the lower track portion 113 to guide the cam follower from the position 105b in the track portion 112 to the position 105c in the track portion 113, when the cam member is lowered with the valve stem. The cam track further includes a second lower portion 115 which is connected with the upper portion 113 by a groove 116. As shown, the lower edge of the groove 116 underlies the end of the upper portion 113 to guide the cam follower from the position 105c in the track portion 113 to the position 105d in the track portion 115 during the subsequent downward movement of the cam member and valve stem. The cam track also includes a further upwardly extending portion 117 which overlies the lower portion 115 to guide the cam follower 105 from the position 105d in the lower track portion 115 to an upper portion 118, corresponding generally to the portion 111. As previously described, the second half of the cam track is symmetrical with the first half and produces a similar cycle of operations during a subsequent regeneration. Further description of the second half of the cam track is accordingly deemed unnecessary.

As previously described, the valve is shown in its service position in FIG. 1 with the valve element 62 closing the second port 32 and the drain valve element 64 closing the drain port 65. At that time, port 31 is open and port 38 is also open so that water from the inlet chamber 25 can flow through the port 31 and through conduit 16 to the top of the tank. The treated water from the bottom of the tank flows through conduit 17, lower chamber 36 and port 38 to the service outlet 37. During the service run, the cam follower 105 is positioned at 105a in the upper track portion 111 of the cam groove. In order to start the regeneration, the valve 102 is opened to discharge fluid from the operator chamber 94. The fluid pressure acting on the underside of the diaphragm 91 moves the valve stem 63 and the cam member 104 upwardly. As the stem and cam member move upwardly, the cam follower 105 engages the downwardly inclined portion 113 of the cam groove and rotates the cam through an angle such as 45° until the follower moves to the position 105b into the lower portion 112 of the cam groove. In the embodiment shown, upward movement of the valve member is limited by engagement between the washer 92 on the diaphragm and the cap as shown in FIG. 2. When the valve member is in its fully raised position, valve element 61 closes the first port 31 and valve element 65 closes the by-pass port 38. The second port 32 is opened and the drain port 35 is also open during regeneration so that water is supplied to the chamber 27 and to the inlet of the ejector 24. The ejector draws regenerant in through the regenerant inlet 42 and the water and regenerant mixture passes through the lower chamber 36 to the bottom of the treatment tank. The effluent from the top of the treatment tank passes through conduit 16, chamber 26 and drain port 35 to drain. The regenerant control valve 22 shuts off the flow of regenerant to the ejector after a predetermined quantity has been introduced into the treatment tank, and the flow through the ejector thereafter provides a slow rinse of the bed of exchange material.

It has been found advantageous to provide a short relatively rapid rinse through the bed, after the completion of the slow rinse phase. Accordingly, the valve member is thereafter indexed to a third or rapid rinse position. In order to effect this operation, the valve 102 is closed to allow fluid pressure to move the valve member 11 downwardly and the valve 102 is thereafter reopened. As the valve member 11 moves downwardly, the cam follower 105 passes upwardly through the upwardly inclined groove 114 and turns the cam through a further angle until the follower reaches the position 105c in the upper portion 113 of the cam groove. When the valve member 11 is thereafter moved downwardly in response to reopening of the valve 102, the follower moves in the downwardly inclined portion 116 to the position 105d until it engages the lower portion 115 of the cam groove. The cam member is arranged to stop the valve member in a preselected axial position in which the by-pass valve 65 is open to by-pass the ejector and provide rapid rinse of the bed of exchange material. In the form shown, the groove 115 has a bottom or stop 120 arranged to engage the follower and stop downward movement of the valve member, when the latter reaches the position shown in FIG. 3. In this position, the valve element 61 closes the first port 31 and the drain port 35 and the second port 32 are opened. In addition, the by-pass valve element 65 is positioned slightly below the by-pass port 38 to open the same and by-pass the ejector. Thus, water from the inlet chamber 25 flows through the lower chamber 27, by-pass port 38 and conduit 17 to the bottom of the tank and the treated water flows from the top of the tank through the drain port 35 to drain. When the selectively operable valve 102 is thereafter closed, the valve member moves downwardly and the cam follower 105 rides upwardly in the upwardly inclined cam groove 117 to turn the cam to a position 180° from its initial position. The valve is then back in its service position and the cam is in a position to start a new cycle of operations. With this arrangement, the valve member is selectively moved to different axial positions in response to successive opening and closing of the valve 102. The electro-responsive operator 103 for the valve may be operated by a suitable timer arrangement or the like and, as diagrammatically shown in FIG. 1, as operated by a timer motor 121. The timer motor operates a cam 122 having a first lobe 122a and a second lobe 122b. The cam 122 controls a switch 123 for energizing the electro-responsive operator 103. As the cam 92 rotates, it first closes the switch 123 for a timer interval corresponding to the duration of the regeneration and slow rinse phases of the regeneration cycle, and then momentarily opens the circuit to the operator 103 to close the valve 102 and thereafter reopen the same for a time interval corresponding to the duration of the rapid rinse phase. Any suitable arrangement may be provided for controlling energization of the timer motor 121. As shown, starting of the timer is controlled by a manually operable switch 124. A switch 125 operated by a cam 126 driven by the timer motor is connected in parallel with the switch 94 to reestablish a holding circuit for the timer motor to maintain the same energized for a complete cycle.

The drain passage 34 has a restriction 34a intermediate the drain chamber 33 and the drain outlet 34 to control the rate of flow during the rapid rinse phase of the regeneration cycle (the brine and slow rinse flows are substantially less than the backwash flow and are controlled by the ejector 24). As will be seen from FIGS. 1–3, the enlarged portion 85 on the valve stem 63 is spaced above the drain port 35 when the valve member is in its raised position during brining or rapid rinsing, as shown in FIGS. 2 and 3. However, as the valve member moves downwardly from its raised position, the enlarged portion 85 on the stem moves into the drain port 33 at about the time the valve element 61 uncovers the port 31, so that the enlarged portion restricts flow to the drain port 35 somewhat to produce a pressure drop sufficient so that line pressure acting on the upper side of the diaphragm 91 can move the valve member down to its lower position shown in FIG. 1, when the valve 102 is closed.

We claim:
1. A multiport valve comprising, a casing having an inlet chamber and first and second outlet chambers therein, a fluid inlet passage communicating with said inlet chamber, said casing having first and second ports therein between said inlet chamber and said first chamber and between said inlet chamber and said second chamber, respectively, a first tank connecting passage in said casing communicating with said first chamber, a second tank connecting passage in said casing, an ejector including raw water inlet connected to said second outlet chamber to receive fluid under pressure; a regenerant inlet connected to said ejector; and an outlet communicating with said second tank connecting passage, a third port between said second chamber and said second tank connecting passage, a valve means in said casing mounted on a common stem member for controlling flow through each said first, second and third ports, said valve means being movable between a service position closing said second port and opening said first and third ports; a regeneration position opening said second port and closing said first and third ports, and a rinse position closing said first port and opening said second port and at least partially opening said third port to pass rinse fluid to said second tank connecting passage, and valve member actuating means operative upon successive actuations thereof for moving said valve means between said service position; said regeneration position and said rinse position.

2. A multiport valve comprising, a casing having an inlet chamber and first and second outlet chambers therein, a fluid inlet passage communicating with said inlet chamber, said casing having first and second ports therein between said inlet chamber and said first chamber and between said inlet chamber and said second chamber respectively, a first tank connecting passage in said casing communicating with said first chamber, a second tank connecting passage in said casing, said casing having a drain port communicating with said first chamber and axially aligned with said first and second ports, a service outlet passage communicating with said second chamber, an ejector having a raw fluid inlet connected to said second outlet chamber to receive fluid under pressure; a regenerant inlet connected to said ejector; and an outlet connected to said second tank connecting passage, said casing having a third port between said second chamber and said second tank connecting passage, a valve means in said casing mounted on a common stem and including a plurality of spaced valve elements movable with said stem from a service position closing said drain port and said second port and opening said first port and said third port; a regeneration position opening said drain port and said second port and closing said first port and said third port; and a rinse position closing said first port and opening said drain port and said second port and at least partially opening said third port to pass rinse fluid to said second tank connecting passage, and valve member actuating means operative upon successive actuations thereof for moving said valve means between said service position; said regeneration position and said rinse position.

3. A multiport valve comprising, a casing having an inlet chamber and first and second outlet chambers therein, a fluid inlet passage communicating with said inlet chamber, said casing having first and second ports therein between said inlet chamber and said first chamber and between said inlet chamber and said second chamber respectively, a first tank connecting passage in said casing communicating with said first chamber, a second tank connecting passage in said casing, said casing having a drain port communicating with said first chamber and axially aligned with said first and second ports, a service outlet passage communicating with said second chamber, an ejector having a raw fluid inlet connected to said second outlet chamber to receive fluid under pressure; a regenerant inlet connected to said ejector; and an outlet connected to said second tank connecting passage, said casing having a third port between said second chamber and said second tank connecting passage, a valve means in said casing mounted on a common stem and including a plurality of spaced valve elements movable with said stem from a service position closing said drain port and said second port and opening said first port and said third port; a regeneration position opening said drain port and said second port and closing said first port and said third port; and a rinse position closing said first port and opening said drain port and said second port and at least partially opening said third port to pass rinse fluid to said second tank connecting passage, a pressure responsive operator attached to said stem for reciprocating the valve means, means including a selectively operable valve for controlling the application of fluid pressure to at least one side of said pressure responsive operator, an annular cam mounted on said stem for axial movement therewith and having an annular cam track disposed concentric with said stem, and follower means on said casing engaging said cam track in said cam for controlling movement of said valve means between said service position; said regeneration position and said rinse position upon successive actuations of said pressure responsive operator.

4. A multiport valve comprising, a casing having an inlet chamber and first and second outlet chambers therein, a fluid inlet passage communicating with said inlet chamber, said casing having first and second ports therein between said inlet chamber and said first chamber and between said inlet chamber and said second chamber respectively, a first tank connecting passage in said casing communicating with said first chamber, a second tank connecting passage in said casing, said casing having a drain port communicating with said first chamber and axially aligned with said first and second ports, a service outlet passage communicating with said second chamber, an ejector having a raw fluid inlet connected to one of the items comprising said inlet chamber and said second outlet chamber to receive fluid under presusre; a regenerant inlet connected to said ejector; and an outlet connected to said second tank connecting passage, said casing having a third port between said second chamber and said second tank connecting passage, a valve means in said casing mounted on a common stem and including a plurality of spaced valve elements movable with said stem from a service position closing said drain port and said second port and opening said first port and said third port; a regeneration position opening said drain port and said second port and closing said first port and said third port; and a rinse position closing said first port and opening said drain port and said second port and at least partially opening said third port to pass rinse fluid to said second tank connecting passage, means on one end of said casing defining a fluid operator chamber, a pressure responsive operator attached to said stem for reciprocating said valve means, means including a selectively operable valve for controlling the application of fluid pressure to said operator chamber, an annular cam disposed in said operator chamber and mounted on said stem for axial movement therewith, said cam having an annular cam track disposed coaxial with said stem, and follower means on said casing engaging said cam track in said cam for controlling movement of said valve means between said service position; said regeneration position and said rinse position upon successive actuations of said pressure responsive operator.

5. A multiport valve comprising, a casing having an inlet chamber and first and second outlet chambers, a fluid inlet passage communicating with said inlet chamber, said casing having first and second ports therein between said inlet chamber and said first chamber and between said inlet chamber and said second chamber, respectively, a first tank connecting passage in said casing communicating with said first chamber, a second tank connecting passage in said casing, said casing having a drain port communicating with said first chamber and aligned with said first and second ports, an ejector including a raw fluid inlet connected to one of said items comprising said inlet chamber and said second outlet chamber to receive fluid under pressure; a regenerant inlet connected to said ejector; and an outlet communicating with said second tank connecting passage, a third port between said second chamber and said second tank connecting passage, a service outlet port communicating with said second chamber, a valve stem having a main valve means thereon controlling flow through said first and second ports; a drain valve means thereon controlling flow through said drain port and a by-pass valve means thereon controlling flow through said third port, said stem being normally disposed in a first position in which said main valve means opens said first port and closes said second port; said drain valve means closes said drain port; and said by-pass valve means opens said third port, means for reciprocating said valve stem, and control means on said stem operable on successive reciprocations of said stem to control movement thereof sequentially to a second position in which said main valve means opens said second port and closes said first port; said drain valve means opens said drain port; and said by-pass valve means closes said third port, and a third position in which said main valve opens said second port and closes said first port; said drain valve means opens said drain port; and said by-pass means at least partially opens said third port to pass rinse fluid to said second tank connecting passage.

6. The combination of claim 5 wherein said means for reciprocating said stem includes a fluid pressure responsive operator, means on said casing defining an operator chamber at one side of said operator, passage means in said stem communicating at one end with said operator chamber and at the other end with said inlet chamber for passing a restricted flow of fluid to said operator chamber, and selectively operable valve for controlling exhausting of fluid pressure from said operator chamber.

7. The combination of claim 5 wherein said control means includes an annular cam member mounted on said stem and having an annular cam track coaxial with said stem, and a follower on said casing engaging said cam track.

8. A multiport valve comprising, a casing having an inlet chamber, first and second outlet chambers, and a drain chamber, a drain passage communicating with said drain chamber for passing fluid to drain, a fluid inlet passage communicating with said inlet chamber, said casing having first and second axially aligned main ports therein between said inlet chamber and said first chamber and between said inlet chamber and said second chamber, respectively, a first tank connecting passage in said casing communicating with said first chamber, a second tank connecting passage in said casing, said casing having a drain port between said drain chamber and said first chamber and aligned with said first and second ports, a valve stem having a main valve means thereon controlling flow through said first and second ports and a drain valve means thereon controlling flow through said drain port, a fluid pressure operator attached to said stem and having one side exposed to fluid pressure in said drain chamber, means on said casing defining an operator chamber at the other side of said operator, said drain passage having a restriction therein for restricting the flow of fluid to drain, means for supplying a restricted flow of fluid to said operator chamber, selectively operable valve means operative when open to pass fluid from said operator chamber to drain at a rate in excess of said restricted flow to reduce the pressure at said other side of said operator, and means on said stem extending into said drain port for restricting the flow of fluid from said first chamber to said drain chamber, said last mentioned means having a length to substantially uncover said drain port when said main valve means is in a position closing said first port whereby the flow to drain is regulated substantially by said flow restriction in the drain passage.

9. The combination of claim 8 wherein said selectively operable valve means has an outlet communicating with said drain passage at the side of said restriction in the drain passage remote from said drain chamber.

10. A multiport valve comprising, a casing having an inlet chamber, first and second outlet chambers, a third drain chamber adjacent said first chamber, and a fourth chamber adjacent said second outlet chamber; a drain passage communicating with said drain chamber for passing fluid to drain, a fluid inlet passage communicating with said inlet chamber, a first tank connecting passage communicating with said first outlet chamber, a second tank connecting passage communicating with said fourth chamber, and a service outlet passage communicating with said second outlet chamber, said casing having first and second axially aligned main ports therein between said inlet chamber and said first chamber and between said inlet chamber and said second chamber, said casing having a third drain port between said first chamber and said third drain chamber and a fourth port between said second chamber and said fourth chamber, a valve stem having a main valve means thereon controlling flow through said first and second ports; a drain valve means thereon controlling flow through said drain port; and an additional valve means thereon controlling flow through said fourth port, a fluid pressure operator attached to said stem and having one side exposed to fluid pressure in said drain chamber, means on said casing defining an operator chamber at the other side of said operator, means for supplying and exhausting fluid pressure from said operator chamber, said drain passage having means for restricting flow therethrough to maintain the pressure in the drain chamber above atmospheric pressure when the drain valve member is open, means on said stem extending into said drain port for restricting flow through from said one chamber to said drain chamber, said last mentioned means being arranged to substantially uncover said drain port when said main valve means is in a position closing said first port.

11. The combination of claim 10 including means in said operator chamber operable on successive reciprocations of said stem to stop said stem in different axial positions.

References Cited by the Examiner
UNITED STATES PATENTS

| | | | |
|---|---|---|---|
| 762,538 | 6/04 | Lamb | 251—44 |
| 2,722,514 | 11/55 | Sloan | 210—191 XR |
| 2,825,363 | 3/58 | Bird | 137—625.6 XR |
| 2,870,788 | 1/59 | Hull | 137—625.46 XR |
| 3,018,788 | 1/59 | Perlis | 137—624.11 XR |

ISADOR WEIL, *Primary Examiner.*